United States Patent [19]

Keen

[11] 4,049,047

[45] Sept. 20, 1977

[54] LIQUID HEAT EXCHANGE SYSTEM WITH SEPARATELY COMPARTMENTED MAKE-UP TANKS

[75] Inventor: John William Keen, Telford, England

[73] Assignee: Marston Excelsior Limited, England

[21] Appl. No.: 592,269

[22] Filed: July 1, 1975

[51] Int. Cl.² .............................................. F01P 3/12
[52] U.S. Cl. ................................. 165/107; 123/41.29; 123/41.33; 123/41.31; 237/66
[58] Field of Search .................... 165/107; 237/66; 123/41.29, 41.51, 41.31–41.33

[56] References Cited

U.S. PATENT DOCUMENTS

| 847,446 | 3/1907 | Strom | 237/66 |
|---|---|---|---|
| 1,974,907 | 9/1934 | Worth | 123/41.29 X |
| 2,365,166 | 12/1944 | Bay | 123/41.33 X |
| 3,202,355 | 8/1965 | Carlson | 237/61 X |

FOREIGN PATENT DOCUMENTS 1,308,336  12/1961  France ............................... 123/41.31

Primary Examiner—Albert W. Davis, Jr.
Attorney, Agent, or Firm—Cushman, Darby & Cushman

[57] ABSTRACT

A make-up tank is provided for two separate heat exchanger circuits operating at different temperatures, the tank having three compartments, a first compartment acting as a make-up tank for the first circuit, a third compartment as a make-up tank for the second circuit and a second or stagnant buffer compartment to separate the first and third compartments. A water level monitor and supply system is provided in one of the compartments only and the compartments are in restricted communication with each other.

7 Claims, 1 Drawing Figure

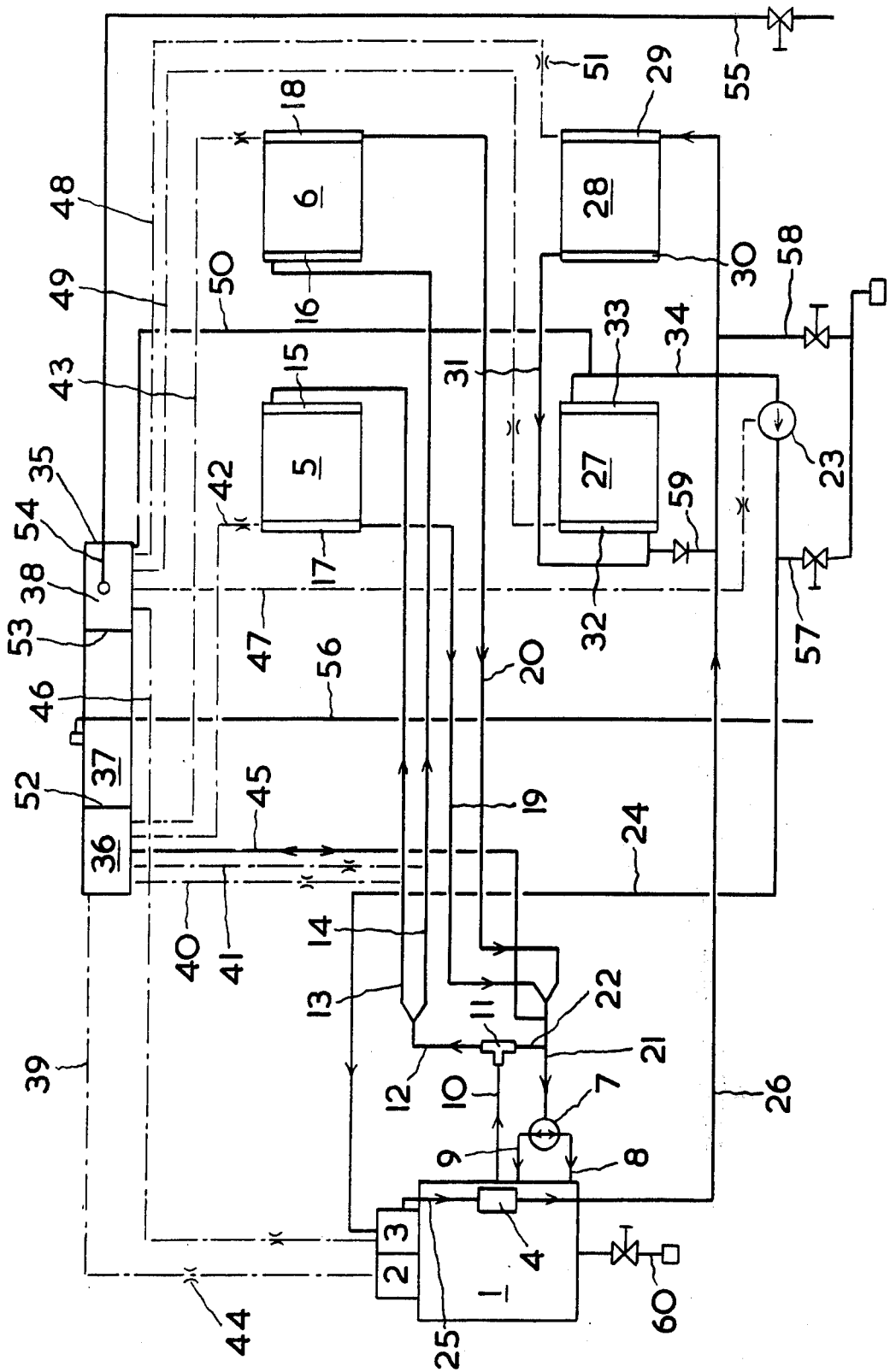

LIQUID HEAT EXCHANGE SYSTEM WITH SEPARATELY COMPARTMENTED MAKE-UP TANKS

This invention relates to make-up tanks and has particular reference to such tanks for heat exchanger circuits operating at different temperatures.

Large horsepower prime mover diesel engines such as those used on railway locomotives require arrangements for cooling several different functions. For example, the air for combustion in the cylinders is frequently compressed by turbo charging to increase the horsepower output available from a given size of engine. The air that is so compressed increases correspondingly in temperature and it has been found advantageous to cool it, thus increasing its density and further enhancing the performance of the engine. This function is achieved by a charge cooler which, in the case of the High Speed Train is an engine-mounted water-cooled unit. The engine lubricating oil is also cooled in a separate engine-mounted oil cooler by means of the water that is passed to it in series from the charge cooler.

Additionally the exhaust manifold is water cooled as are the main cylinders of the engine.

The water serving the last two duties runs at a much higher temperature level (approximately 85° C normal maximum) than the water serving the oil and charge cooling duties (46° C maximum at the charge cooler inlet). Therefore separate water circuits are necessary for these two sets of duties to avoid temperature mixing which would degrade the cooling efficiency of the cooler circuit and, of course, correspondingly increase the cooling efficiency of the hotter circuit. In addition, up to the present time separate make-up tanks have been used to supply water to each circuit.

By the present invention there is provided a liquid make-up tank for two heat exchanger circuits adapted to contain the same liquid comprising a tank having three zones, a first zone, a second or buffer zone, and a third zone, the first zone being in direct communication with the second zone for the passage of liquid therebetween, the third zone being in direct communication with the second zone for the passage of liquid therebetween, there being no direct communication between the first and third zones except through the second zone, a liquid supply line and at least one return line for the first heat exchanger circuit being connected to the tank in the first zone, a liquid supply line and at least one return line for the second heat exchanger circuit being connected to the tank in the third zone.

There may be means to supply liquid to the tank, and there may be means to control the level of liquid in the tank.

The liquid may be water. The water may contain an anti-freeze. The liquid may be supplied by means of a float controlled valve to control the maximum liquid level. A fall in liquid level to a predetermined minimum may be detected by a float actuated device. A visual indication of level may also be provided on the tank.

The second zone may be located between the first and third zones. The tank may be rectangular in plan view with baffles between the zones. The means to supply the liquid or to monitor the level may be in any of the zones as most convenient, but preferably the supply is located in the coldest zone to avoid displacing hot fluid into the colder system.

The present invention also provides a liquid filled heat exchanger system, comprising a first circuit including at least one first heat generator and at least one first heat remover, a second circuit including at least one second heat generator and at least one second heat remover, the two circuits operating, in use, at two different average temperatures, a liquid make-up tank for both circuits, the tank having three zones, a first zone, a second buffer zone and a third zone, the first zone being in direct communication with the second zone for the passage of liquid therebetween, the third zone being in direct communication with the second zone for the passage of liquid therebetween, there being no direct communication between the first and the third zones except through the second zone, a liquid supply line and at least one liquid bleed return line for the first circuit, the lines being connected to the first zone, a liquid supply line and at least one liquid bleed return line for the second circuit, the lines being connected to the third zone.

There may be means to control the liquid level in the tank, and means to supply liquid to the tank. The means to control the level and supply the liquid may be a float operated valve.

The liquid may be water. The water may contain an anti-freeze. The second zone may be located between the first and third zones. The tank may be rectangular in plan view with a baffle between the first and second zones and a baffle between the second and third zones. The means to supply the liquid or to monitor the level may be in any of the zones as most convenient, but preferably the supply is located in the coldest zone to avoid displacing hot fluid into the colder system.

By way of example, embodiments of the present invention will now be described with reference to the accompanying drawing which is a schematic diagram of a coolant circuit.

The main generator of heat is a diesel engine 1 which is fed with turbo-charged air via a turbo-charger 2 which has a charge cooler 3. Also associated with the engine 1 is an oil cooler 4. The main engine is a water-cooled engine which has a primary coolant circuit utilising two heat exchangers 5 and 6. The main passage of water for the coolant circuit is as follows. Starting at the pump 7 coolant water is passed into the engine via lines 8 and 9. Heated water then emerges along line 10 through a by-pass valve 11 and lines 12, 13 and 14 to inlet tanks 15 and 16 of radiators 5 and 6 respectively. The cooled water which collects in the outlet tanks 17 and 18 returns via lines 19, 20 and 21 to pump 7. Line 22 indicates a direct access between the line 10 and line 21 via by-pass valve 11 to enable direct flow to occur through circuit line 21, pump 7, lines 9 and 8, engine 1, line 10, by-pass valve 11 and back to line 21 for starting and warming-up purposes, thereby by-passing radiators 5 and 6.

The coolant path for cooling the charge cooler 3 and the oil cooler 4 is as follows. Starting at pump 23 water passes through line 24, charge cooler 3, line 25, oil cooler 4 and line 26 to the radiators 28 and 27. The water passes initially into inlet tank 29 through outlet tank 30 and line 31 to the inlet tank 32. From the outlet tank 33 the water passes via line 31 back to the pump 23. The radiators 5 and 6 and also 27 and 28 are cooled by fan blown air drawn from outside the train in which the circuits are installed.

To prevent air or other gas (such as exhaust gas) accumulation, the high points of the water circuit are provided with bleed or return tubes which pass to a make-up tank 35. The make-up tank has three compartments 36, 37 and 38 whose function will be explained in detail below.

It is to be appreciated that the bulk of the water circulating does not pass into the make-up tank. Gas tends to accumulate at the high points of the heat exchangers, and other parts in the water circuits, and a series of bleed lines are led from these high points to the make-up tank. For example, the zone 36 of the make-up tank has five bleed lines 39, 40, 41, 42 and 43 leading from various points in the circuit. The turbo-charger is cooled by the main engine circuit, hence line 39 going to zone 36. Each of these bleed lines contains a small restrictor such as 44 to limit flow through the line. Once all the air has bled through these lines a small flow of water passes through into the zone 36. This flow of water is returned to the circuit by the line 45.

In a similar manner the zone 38 has four bleed lines 46, 47, 48 and 49 leading into it and return line 50 back to the second circuit. Again the bleed lines have restrictors such as 51 to limit the flow of water through the lines.

Because the two circuits work at different temperatures, it is undesirable that the liquids should mix and the stagnant second zone 37 between the two zones 36 and 38 provides a suitable barrier. Baffles 52 and 53 define the three zones within the tank 35. A single float and valve assembly 54 is used to top up the tank 35 via line 55. A single overflow 56 is provided for the three zones in the tank.

To enable the circuits to be drained, drain lines 57, 58 and 59, which includes a one-way valve, are provided for the secondary circuit and drain line 60 is provided for the primary circuit.

Prior to the triple zone make-up tank of the present invention, separate make-up tanks were used for the two circuits. This meant that separate level monitors and water supply systems had to be used. Thus the present invention is simpler and cheaper and is easier to operate and to service.

More importantly the individual volume of each zone is obviously less than the volume of all three zones put together. This means that in the event of a small leak developing in either one of the circuits the volume of water available to replace water leaking is greater than would be available if separate tanks were used. This means that the equipment can run for a greater period of time than would have been possible using the prior art arrangement of separate make-up tanks. Thus in the case of the train utilising this invention, the distance it could run in the event of a leak would be twice that of the prior art for the same volume of water in the make-up tank. Clearly this is of importance in that it enables a more reliable train service to be provided.

I claim:

1. A liquid filled heat exchanger system comprising a first circuit including at least one first heat generator and at least one first heat remover, a second circuit including at least one second heat generator and at least one second heat remover, the two circuits operating, in use at two different average temperatures, a liquid make-up tank for both circuits, the tank having three zones, a first zone, a second buffer zone and a third zone, the first zone being in direct communication with the second zone for the passage of liquid therebetween, the third zone being in direct communication with the second zone for the passage of liquid therebetween, there being no direct communication between the first and the third zones except through the second zone, a liquid supply line and at least one liquid bleed return line for the first circuit, the lines being connected to the first zone, a liquid supply line and at least one liquid bleed return line for the second circuit, the lines being connected to the third zone.

2. The system of claim 1 in which there is means to supply liquid to the tank and means to control the level of liquid in the tank.

3. The system of claim 1 in which the liquid is water, optionally containing an anti-freeze.

4. The system of claim 1 in which the liquid is supplied by means of a float controlled valve to control the maximum liquid level.

5. The system of claim 1 in which the second zone is located between the first and third zones.

6. The system of claim 1 in which the supply is located in the coldest zone.

7. The system of claim 1 in which the tank is rectangular in plan view with a baffle between the first and second zones and a baffle between the second and third zones.

* * * * *